N. J. SHAMROY.
ROUNDABOUT.
APPLICATION FILED MAR. 31, 1909.

1,078,645.

Patented Nov. 18, 1913.

2 SHEETS—SHEET 1.

WITNESSES

INVENTOR
Nicholas J. Shamroy
BY
ATTORNEYS

N. J. SHAMROY.
ROUNDABOUT.
APPLICATION FILED MAR. 31, 1909.

1,078,645.

Patented Nov. 18, 1913.

2 SHEETS—SHEET 2.

WITNESSES
J. P. Davis

INVENTOR
Nicholas J. Shamroy
BY
ATTORNEY

UNITED STATES PATENT OFFICE.

NICHOLAS J. SHAMROY, OF NEW YORK, N. Y.

ROUNDABOUT.

1,078,645.

Specification of Letters Patent.   Patented Nov. 18, 1913.

Application filed March 31, 1909. Serial No. 486,879.

*To all whom it may concern:*

Be it known that I, NICHOLAS J. SHAMROY, a citizen of Russia, and a resident of the city of New York, borough of Manhattan, in the county and State of New York, have invented a new and Improved Roundabout, of which the following is a full, clear, and exact description.

The invention relates to roundabouts having traveling passenger cars, and its object is to provide a new and improved amusement apparatus, in which each car has a planetary movement, and the several seats in the car travel in different epicycloidal or in hypocycloidal paths, thus giving the occupants highly enjoyable and sensational rides.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
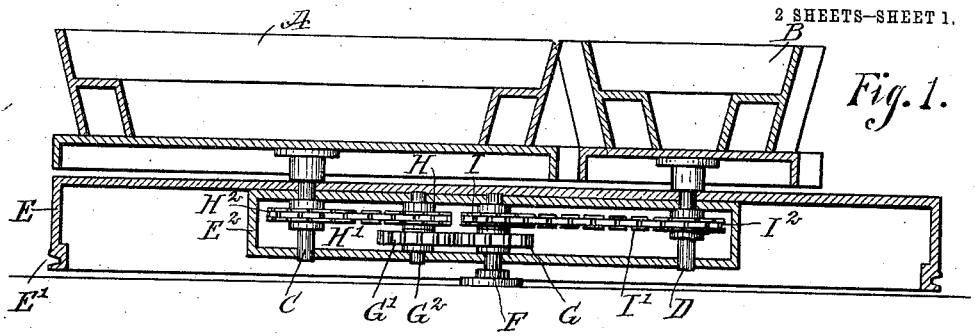
Figure 2:
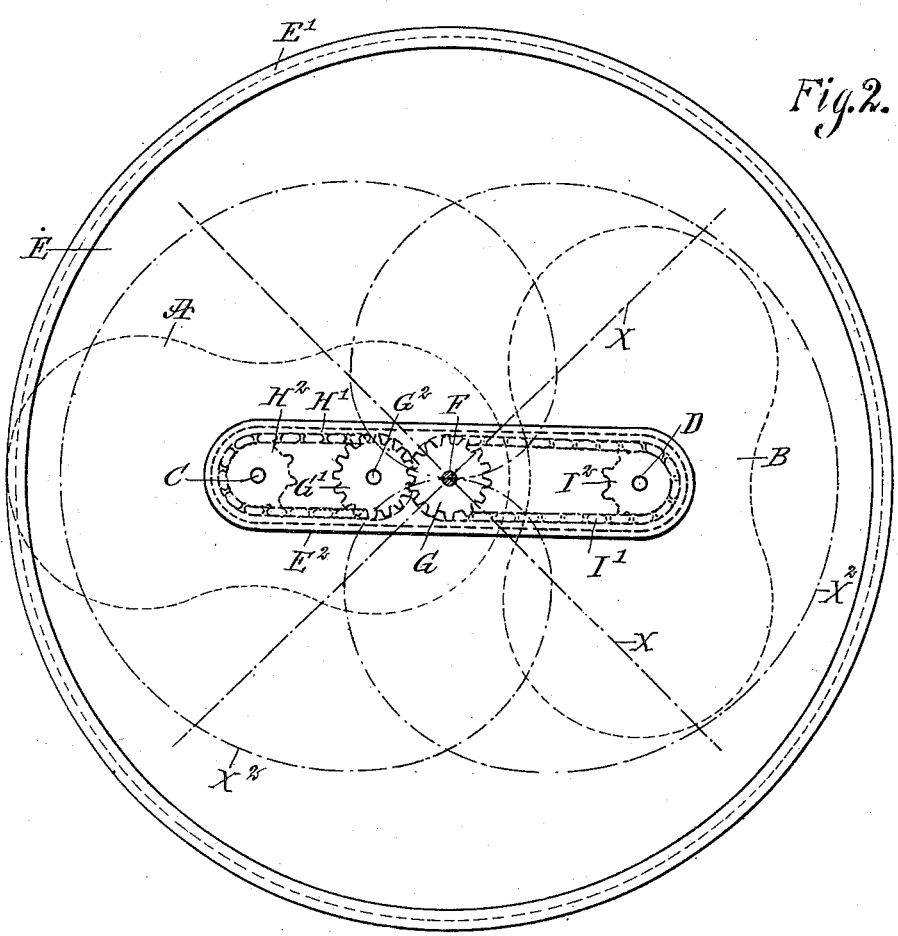
Figure 5:
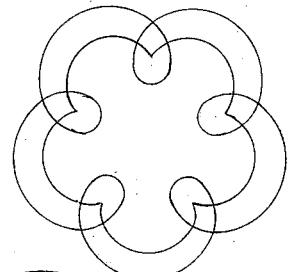
Figure 6:
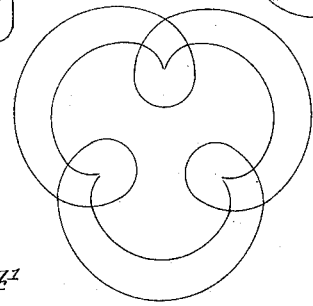
Figure 7:
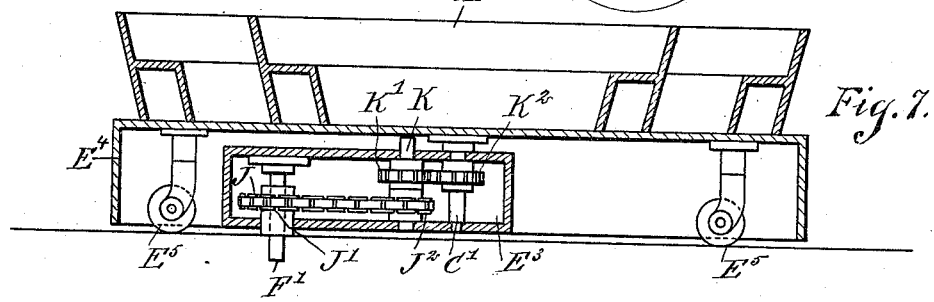
Figure 8:
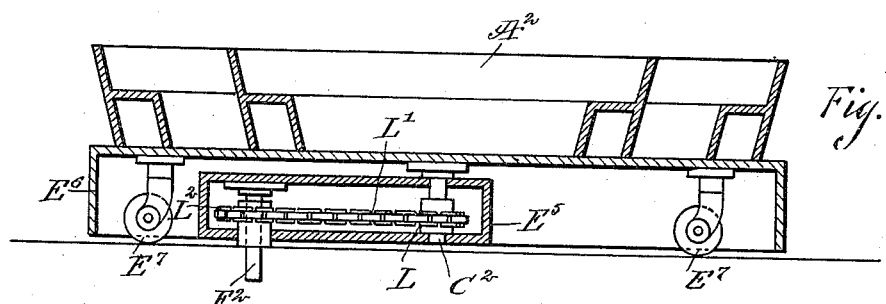

Figure 1 is a sectional side elevation of the improvement arranged with two cars on a single rotating support, the seats in one of the cars traveling in an epicycloidal path and the seats in the other car traveling in a hypocycloidal path; Fig. 2 is an inverted plan view of the same; Figs. 3, 4, 5 and 6 illustrate different paths of the cars; Fig. 7 is a sectional side elevation of a single car, having a planetary gearing for causing the car seats to travel in an epicycloidal path; and Fig. 8 is a like view of a single car in which the car seats travel in a hypocycloidal path.

In the apparatus shown in Figs. 1 and 2, use is made of two cars A and B, of elongated, irregular or other shape, as indicated in dotted lines in Fig. 2, so that the seats in each car are different distances from the center thereof, and the cars are provided at their centers with shafts C and D, journaled in a support E in the form of a circular box, provided on its periphery with a pulley E', connected by a belt with other machinery, to impart a rotary motion to the support E, the latter turning on a stud F, on which is journaled a casing $E^2$, located within the support E and forming a part thereof. The stud F is attached to a suitable foundation, and on the stud F within the casing $E^2$ is secured a gear wheel G in mesh with a gear wheel G', fastened on a shaft $G^2$ journaled in the casing $E^2$, and on the shaft $G^2$ is secured a sprocket wheel H, connected by a sprocket chain H' with a sprocket wheel $H^2$, secured on the shaft C of the car A. On the stud F within the casing $E^2$ is also secured a sprocket wheel I, connected by a sprocket chain I' with a sprocket wheel $I^2$, secured on the shaft D of the car B. Now when the support E is rotated then the shafts C and D are carried around by the support in a circular path, as the shafts are spaced equidistant from the axis of the fixed stud F. As the sprocket wheel is fixed, it is evident that when the support E revolves and carries the shaft D along, then a rotary motion is given to the shaft D by the sprocket wheel $I^2$, the sprocket chain I' and the stationary sprocket wheel I, so that the car B has a planetary movement and each seat of the car travels in a hypocycloidal path. At the same time the car A has a planetary movement and each seat of the car travels in an epicycloidal path, owing to the planetary gearing above described; that is, when the support E is rotated the gear wheel G' rolls off on the stationary gear wheel G, thus giving a rotary motion to the shaft $G^2$, the motion of which is transmitted by the sprocket wheel H, sprocket chain H' and the sprocket wheel $H^2$ to the shaft C of the car A. By arranging the seats in the cars A and B different distances from the axes of the shafts C and D, it is evident that when the apparatus is in use the seats in the car A describe different epicycloids, and the seats in the car B describe different hypocycloids.

In the above construction, the cars are so arranged that when rotating, they will always, when the longitudinal axis of one is at right angles to the longitudinal axis of the other, occupy the relative position shown in Fig. 2, so that the end of one car can never interfere with the end of the other. That is, the end of each car is received in the recess of the side of the other car when the cars occupy the above position.

In the arrangement shown in Fig. 7, the car A' has an epicycloidal movement, and for this purpose its shaft C' is journaled in a casing $E^3$, secured on a shaft F' driven by suitable machinery and journaled in a suitable bearing. The car A' is mounted on a support $E^4$, which incloses the casing $E^3$, and the support $E^4$ is provided with casters $E^5$, adapted to travel on a suitable foundation. The shaft $F'$ extends through and is secured to the hub of a fixed sprocket wheel J, connected by a sprocket chain $J'$ with a sprocket wheel $J^2$, secured on a shaft K, connected by a gear wheel $K'$ with a gear wheel $K^2$ fastened on the car shaft $C'$. Now when the shaft $F'$ is driven, the casing $E^3$ is caused to swing around, thus carrying the car $A'$ bodily around in a circle, and at the same time a rotary motion is given to the car $A'$, owing to the planetary gearing described, and connecting the shaft $C'$ with the fixed sprocket wheel J.

In the arrangement shown in Fig. 8, the car $A^2$ travels in a hypocycloidal path, and for this purpose the shaft $C^2$ of the car is journaled in a casing $E^5$ secured on a shaft $F^2$, journaled in a fixed bearing, and connected with suitable machinery for rotating the shaft $F^2$ and swinging the casing $E^5$ around, so that the car $A^2$ travels bodily in a circle. The car $A^2$ is also rotated, and for this purpose the shaft $C^2$ is provided with a sprocket wheel L, connected by a sprocket chain $L'$ with a fixed sprocket wheel $L^2$, through the hub of which passes the shaft $F^2$ and to which it is secured as plainly indicated in Fig. 8. Now by the planetary gearing described, the car $A^2$ is rotated and at the same time carried bodily around, so that each seat in the car $A^2$ travels in a hypocycloidal path. The car $A^2$ is mounted on a box-like support $E^6$, having casters $E^7$ traveling on a suitable foundation, the same as the device shown in Fig. 7.

The shape of the cars in the construction of Figs. 7 and 8 is of no importance, and the said cars may be of any desired shape.

Figure 3:
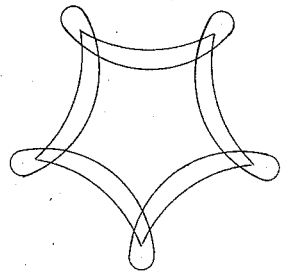
Figure 4:
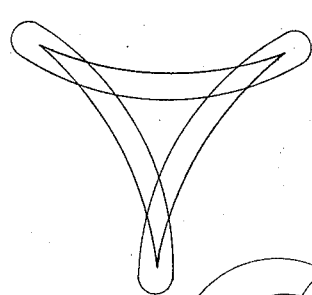

From the foregoing it will be seen that by the arrangement described, every seat of a car has either a hypocycloidal or an epicycloidal path, but the shape of the figures described by the seats depends on the ratio of the gearing. In general, it may be said that the hypocycloid is in the form of a polygon with curved sides or in the form of a star, as indicated in Fig. 3, and according to the distance of a seat in the car from the center thereof, the star will have sharp angles or a loop at each corner, as will be readily understood by reference to Fig. 3. The number of corners or points of the star is equal to the ratio of the gearing, that is, if the ratio is 1 to 5 there are five points or corners in each star, if the ratio is 1 to 3, then there are three corners, as indicated in Fig. 4, and if the ratio is 1 to 2, the path of the seats will be straight lines, as indicated at X in Fig. 2. The epicycloid, in general, has the shape of a rose, as indicated in Fig. 5, in which the number of the petals of the rose is equal to the ratio of the gearing, that is, if the ratio of the gearing is 1 to 3 the seats will travel in a path resembling a trefoil or a shamrock, as indicated in Fig. 6.

It will be seen that the amusement devices, in comparison with others having the same seating capacity, take up but little room, and at the same time the passengers in the cars are treated to enjoyable and sensational rides.

By making the supports, E, $E^4$ and $E^6$ in the shape of boxes, and providing the additional casings $E^2$, $E^3$ and $E^5$ for the transmission, it is evident that the noise incident to the gearing is reduced to a minimum, and the gearing may be kept running in oil contained in the casings $E^2$, $E^3$ and $E^5$, so that the gearing is practically self-oiling, and is free of dust and hence not liable easily to get out of order.

If built on a small scale, the above-described apparatus can be used as a toy.

If desired, the car $A'$, shown in Fig. 7, can be detached from the shaft $C'$ and attached to the shaft K, so as to provide a hypocycloidal movement.

Having thus described my invention, I claim as new and desire to secure by Letters Patent:

1. An amusement apparatus comprising a rotatable support, a fixed shaft at the axis of the support, shafts spaced radially from the fixed shaft, a car oval in shape and contracted transversely at its longitudinal center secured by its center to each shaft, and connections between the shafts of the cars and the fixed shaft for rotating said cars in opposite directions when the support is rotated, for the purpose specified.

2. An amusement apparatus comprising a rotatable support, a fixed shaft at the axis of the support, shafts spaced radially from the fixed shaft, a car secured to each shaft, and connection between the shafts of the cars and the fixed shaft for rotating said cars in opposite directions when the support is rotated, for the purpose specified.

3. An amusement apparatus, comprising a plurality of rotatable shafts, a car having seats on each of said shafts, an operating means, a connection between said means and one shaft for imparting an epicycloidal movement to the seats of the car thereon, and a connection between said means and the other shaft for imparting a hypocycloidal movement to the seats of the car thereon.

4. An amusement apparatus, comprising a shaft, a frame on the shaft, a plurality of shafts journaled in the frame, cars having seats supported by the last named shafts, a connection between the first named shaft and one of the last named shafts for imparting an epicycloidal movement to the seats of the car thereon, and a connection between the first named shaft and the other of the last named shafts for imparting a hypocycloidal movement to the seats of the car thereon.

5. An amusement apparatus comprising a car, a rotatable support to which the car is connected, means for rotating the support and a connection between the rotating means and the support for imparting bodily movement to the car and support around the rotating means, said car being of substantially elliptical shape and provided with marginal seats, whereby to cause the occupants of the seats to move in a path eccentric to the path of movement of the car.

6. An amusement apparatus comprising a rotatable car, means for rotating the car, a connection between the rotating means and the car for moving said car bodily around the rotating means while it is being rotated, said car having a substantially elliptical body provided with marginal seats, whereby to cause the occupants of the seats to move in a path eccentric to the circle described by the car.

In testimony whereof I have signed my name to this specification in the presence of two subscribing witnesses.

NICHOLAS J. SHAMROY.

Witnesses:
THEO. G. HOSTER,
EVERARD B. MARSHALL.

Copies of this patent may be obtained for five cents each, by addressing the "Commissioner of Patents, Washington, D. C."